United States Patent Office 3,495,341
Patented Feb. 17, 1970

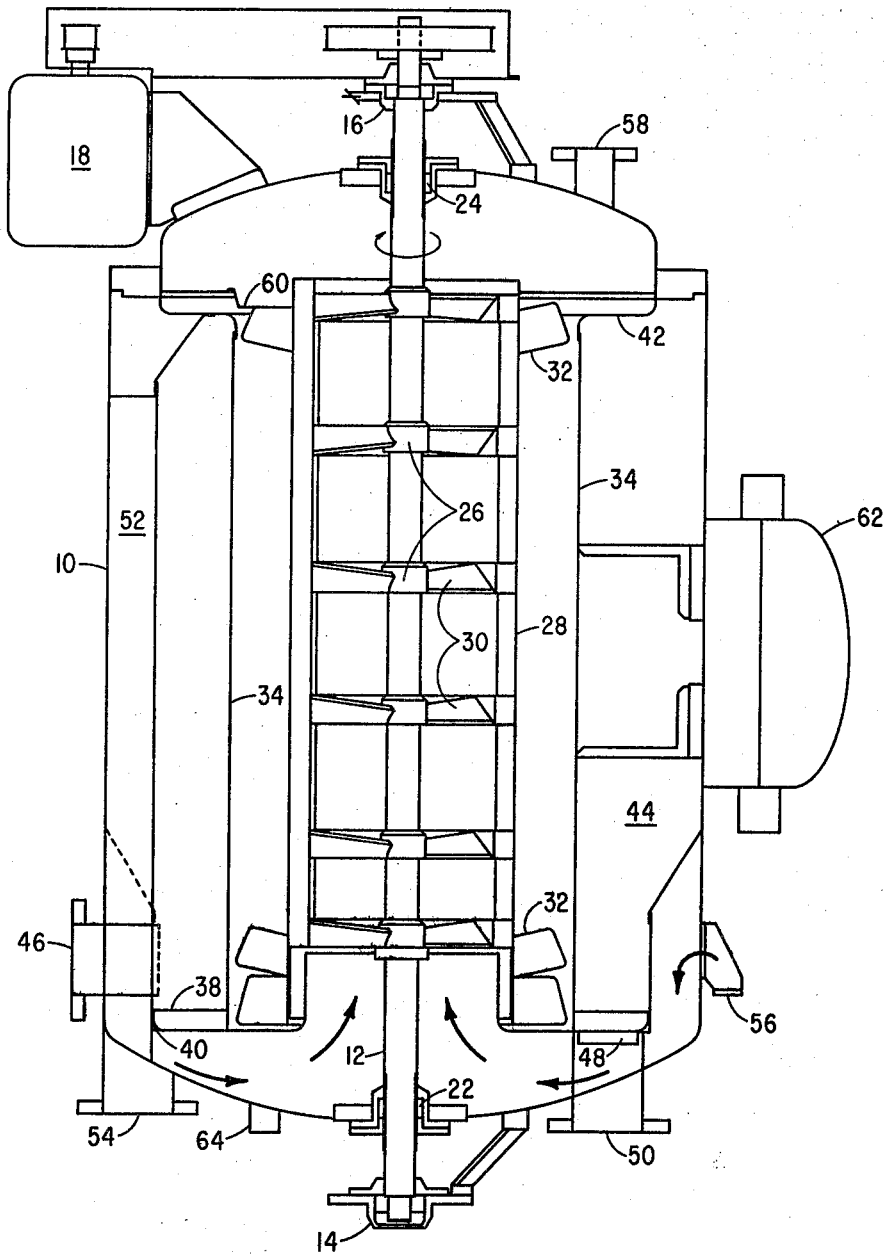

3,495,341
CONTINUOUS PROCESS FOR SURFACE DRYING POLYMER CHIPS AND ENCLOSED APPARATUS
David L. Kolb, Hopewell, and John W. Wagner, Petersburg, Va., assignors to Allied Chemical Corporation, New York, N.Y., a corporation of New York
Filed Apr. 9, 1968, Ser. No. 719,872
Int. Cl. F26b 3/04, 17/10, 23/00
U.S. Cl. 34—14                                         10 Claims

ABSTRACT OF THE DISCLOSURE

The apparatus of this invention provides means for continuously surface drying granular materials such as polymer pellets in an oxygen-free atmosphere whereby oxidative degradation of the polymer is prevented. The surface drying is accomplished by a rotary unit installed in a sealed vessel under a positive pressure of an inert gas which is caused to entrain the pellets in an upward flow thereof upon rotation of said rotary unit.

---

The present invention relates to the surface drying of polymer pellets or chips in an inert atmosphere to prevent oxidation of the polymer. More particularly, the invention is related to the separation of polymer pellets from a water slurry by means of a rotary unit located in a gas-tight vessel which lifts the pellets by centrifugal force from an inert gas being introduced into the vessel under pressure and swirled upwardly within a screened area of the vessel to cause surface drying of the pellets.

It is conventional practice to surface dry polymer chips and the like continuously in an enclosure by means of a rotating shaft having impellers or blades mounted thereon which lift or float the pellets in an air current causing separation from the water slurry, and, consequently, surface drying of said pellets. The performance of this type of drying equipment has been very satisfactory for the drying of most granular materials. One particular exception where we have recognized that this type of dryer can be improved upon is when it is employed to de-water and surface dry polymer pellets prior to the final drying of said polymer.

The apparatus now in use employs a housing which is open to the surrounding atmosphere and the material being dried is always exposed to oxygen. Since synthetic polymers exposed to oxygen result in lower quality products, especially textile filaments, it would be highly desirable to protect the polymer pellets from such exposure during the de-watering step. Thus, the invention herein is based upon the provision of apparatus for surface drying polymer pellets in a gas-tight vessel filled with an inert gas to prevent the oxidative degradation thereof.

One embodiment contemplated for carrying out the present invention comprises a gas-tight vessel having a vertically mounted shaft disposed therein, said shaft being provided with a plural number of impellers positioned at an angle to the normal plane thereof to cause an upward flow of an effluent material when rotated and a porous cage concentrically disposed between the outer extremities of the impellers and the vessel wall. The vessel is provided with inlets for the introduction of a heated gas and polymer pellets in a water slurry. A pair of outlets are provided for discharging the water and the moisture-laden gas which may be dried and re-used.

The invention will be more clearly understood from the details of the following drawing wherein a single figure illustrates the internal structure of a preferred type of rotary unit installed in a gas-tight vessel in accordance with the present invention.

Referring now to the details of the drawing wherein a vessel 10 has a shaft 12 mounted vertically therein. The shaft is mounted for rotation in a pair of bearings 14, 16 and driven by a motor 18. A pair of shaft seals 22, 24 prevent leakage between the shaft and walls of the vessel 10. The shaft 12 has a series of hub-like elements 26 spaced apart along its length which support a plurality of brackets 28, preferably four, concentrically disposed about said shaft and parallel therewith to form a reel-like assembly. The brackets 28 are attached to their respective hubs by means of curved-surface members 30. On the vertical brackets 28 are mounted a multiplicity of impellers 32, most of them not shown. A cylindrical foraminous cage 34 is positioned in close proximity to the extremities of the impellers. The bracket supports 30 and impellers 32 are positioned to function as fan blades to push the surrounding particulate matter upward.

A collection pan 38 having an annular curved lip 39 spans the distance at the lower end between the cage 34 and a side plate 40 which is spaced from but attached to the vessel wall 10. A similar pan 42 is positioned at the top of the reel-like assembly for collecting material and preventing it from entering the chamber 44 located between the vessel side-wall and the foraminous cage 34. An inlet 46 extends through the vessel wall 10 to the collection pan 38. The pan is provided with a discharge opening 48 that leads to an outlet drain 50 through the vessel wall. A section of the upper pan 42 is removed to provide an opening leading into a discharge chamber 52 which is connected to an outlet 54.

In operation, a slurry comprised of polymer pellets and the like mixed with water are continuously introduced into vessel 10 through inlet port 46. The slurry is deposited initially onto the pan 38. Most of the water content drains from the vessel opening 48, 50. A heated inert gas such as nitrogen, carbon oxides, hydrogen and mixtures thereof elevated to a temperature between about 30 and 220° C. and pressurized to between about 5 and 25 p.s.i.g. is introduced into the vessel through inlet port 56. The shaft is rotated by motor 18 in the direction indicated by the arrow at a speed sufficient to establish a fluidization velocity within the central area of the vessel whereby the pellets are lifted or floated upward from pan 38 to pan 42. The centrifugal lifting force of the rotating impellers 32 spins the pellets around the foraminous cage causing surface drying and slings the removed water through the cage or screen 34 from where it drains into the pan 38. The pellets normally have a residence time in the vessel of about one-half second. By "fluidization velocity" is meant the superficial velocity of a gas stream required to suspend and entrain the pellets in said gas stream. The gas flows along the path generally indicated by the several arrows and exits from the vessel at 58. The gas may be re-dried by conventional means, not shown, and returns to the vessel for re-use.

The entrained pellets are conveyed to the upper portion of the vessel, namely pan 42, from which they exit into discharge chamber 52. A scraper bar 60 is mounted at the point where the pellets exit from pan 42 and in close proximity to the rotating impellers to facilitate the discharge of said pellets which depart the vessel through exit port 54 to a collection means, not shown. The support structure in the bottom of the vessel 10 is designed to distribute the incoming gas flow toward the center of the vessel before moving upward. Similarly, the upper portion of the vessel is provided with a distribution plate which prevents pellets from falling down into the outer chamber 44 of the vessel.

A manhole 62 is provided in the side of the vessel 10 to permit access to the interior for cleaning and repair of the structure located therein. A drain access 64 is located in the bottom of the vessel for draining overflow water from pan 38 and for cleaning purposes.

The vessel 10 and all of the internal parts and mechanisms that are exposed to the material being dried should be made from stainless steel or similar materials having the strength and resistance to oxidation to avoid contamination of said material.

While one embodiment of the invention has been shown for purposes of illustration it will be apparent that changes and modifications can be made without departing from the scope of this invention except as set forth in the appended claims.

We claim:

1. Apparatus for continuously de-watering and surface drying granular materials in an inert atmosphere, which comprises:
   (a) an air-tight vessel having a rotatable shaft mounted vertically therein, said shaft being provided with a plurality of impellers, said impellers being positioned to direct a flow of gas upwardly at above fluidization velocity upon rotation of said shaft;
   (b) a porous cage positioned around said shaft in close proximity to the tips of the impellers;
   (c) sidewalls spaced radially outward from the porous cage to form a chamber between said sidewalls and said cage;
   (d) a first inlet for introducing a slurry comprised of granular material and water;
   (e) a second inlet for introducing a heated gas;
   (f) a first outlet for draining water from the said vessel;
   (g) a second outlet in said vessel for discharging the material; and
   (h) means for rotating said shaft to generate an upward flow of gas capable of discharging the material through said second outlet.

2. The apparatus of claim 1 in which a circular flange having an annular lip is associated with the first inlet for receiving the slurry.

3. The apparatus of claim 1 in which a scraper bar is positioned adjacent to the second outlet to facilitate removal of the material from the vessel.

4. The apparatus of claim 1 in which the rotary assembly is a reel-type unit.

5. A method for continuously drying synthetic polymers in an inert atmosphere, which comprises:
   (a) introducing a slurry of polymer pellets and water into the lower portion of a gas-tight vessel;
   (b) separating unabsorbed water from said pellets;
   (c) contacting the pellets with a pressurized inert gas elevated to a temperature between about 60 and 120° C.
   (d) rotating a plurality of vertically disposed impellers to establish a fluidization velocity in said vessel whereby the pellets are floated to the upper portion of said vessel; and
   (e) discharging the pellets from the vessel.

6. The method of claim 5 in which the pellets are circulated within said vessel until substantially all surface moisture is removed from the polymer pellets.

7. The method of claim 6 in which the inert gas is nitrogen introduced at about 5 to 25 p.s.i.g.

8. The apparatus of claim 1 in which said inlet for introducing the slurry and said outlet for discharging the material are located at the bottom of the vessel.

9. The apparatus of claim 4 in which the rotary assembly is comprised of a plurality of curved-surface members mounted on said rotatable shaft which support vertically disposed brackets having a plurality of impellers mounted on said brackets and extending outwardly therefrom.

10. The method of claim 6 in which the surface moisture removed from said pellets is discharged radially from said fluidization zone through a foraminous cage and into a chamber which is in communication with a vessel discharge outlet.

References Cited

UNITED STATES PATENTS

| 2,911,730 | 11/1959 | Schaub et al. | 34—181 X |
| 3,068,584 | 12/1962 | Schaub et al. | |
| 3,075,298 | 1/1963 | Schaub | 34—173 X |

EDWARD J. MICHAEL, Primary Examiner

U.S. Cl. X.R.

34—33, 57